Aug. 7, 1945.  H. A. KNOX  2,380,971
BEARING
Filed March 8, 1944  2 Sheets-Sheet 1

Inventor
Harry A. Knox
By C. E. Herrstrom & H. E. Thibodeau
Attorneys

Aug. 7, 1945. H. A. KNOX 2,380,971
BEARING
Filed March 8, 1944 2 Sheets-Sheet 2

Inventor
Harry A. Knox

Patented Aug. 7, 1945

2,380,971

UNITED STATES PATENT OFFICE 2,380,971

BEARING

Harry A. Knox, Washington, D. C.

Application March 8, 1944, Serial No. 525,512

4 Claims. (Cl. 308—233)

(Granted under the act of March 3, 1883, as amended April 30, 1928; 370 O. G. 757)

The invention described herein may be manufactured and used by or for the Government for governmental purposes without the payment to me of any royalty thereon.

The invention relates to lubricated bearings and means for lubricating the same, and particularly to bearings and lubrication for clutch and other throw-out sleeves and the collars thereon by which thrust is transmitted from a throw-out or clutch pedal or other operating lever to the throw-out sleeve. One example of such a clutch is shown in my copending application, Serial No. 525,511 of even date herewith.

The invention is a special means to provide a combined lubrication for the sleeve interior slide bearing, and also a rotating ball bearing in the collar-receiving channel exteriorly of the sleeve. A further purpose is to provide novel means for communicating lubricant to such bearings.

Additional objects, advantages and features of invention reside in the construction, arrangement and combination of parts involved in the embodiment of the invention, as will be apparent or understood from the following description and accompanying drawings, wherein:

Fig. 3 is a longitudinal section of the sleeve alone;

Figure 1:
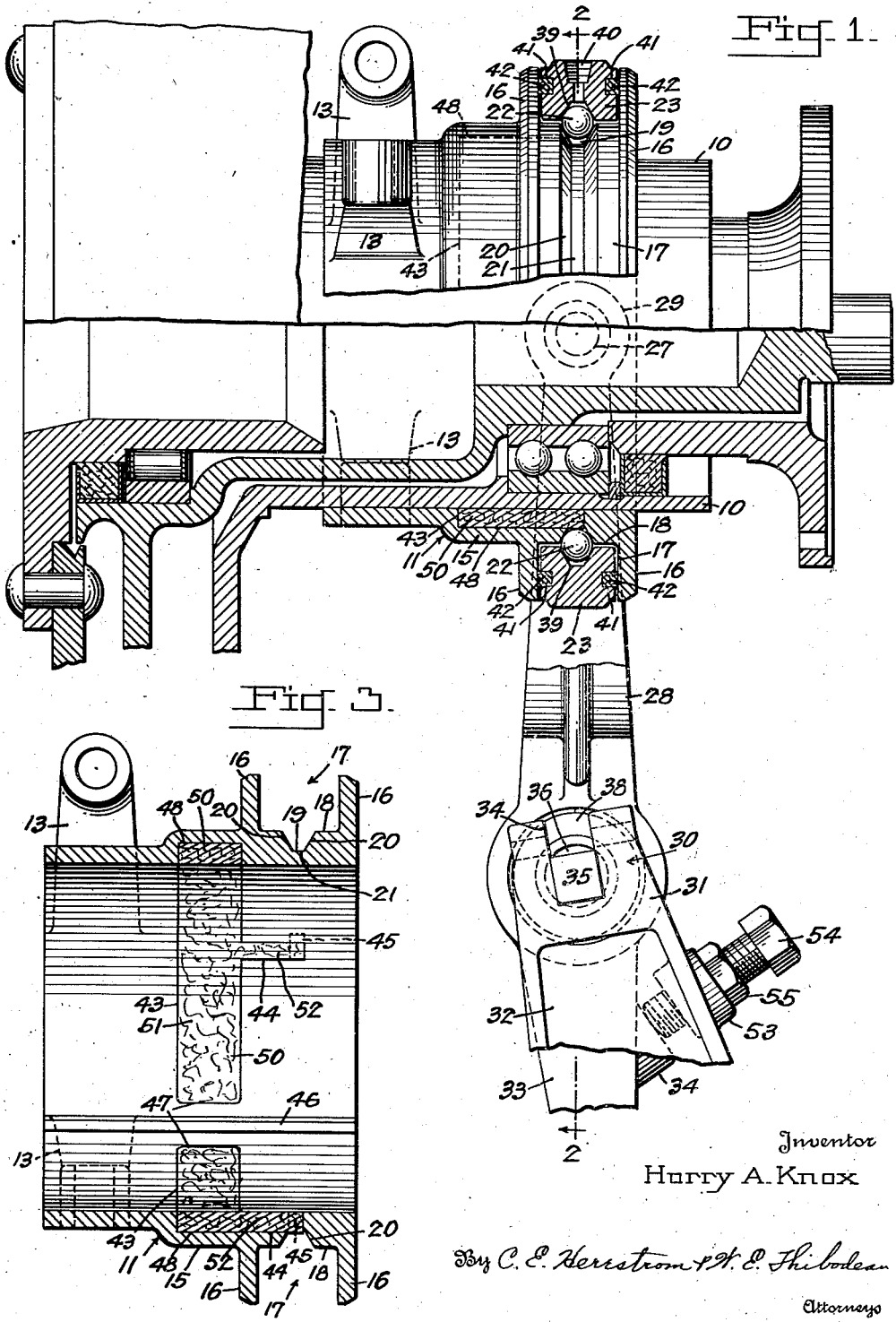
Fig. 1 is an elevation from one side partly in section, of a throw-out sleeve, collar and operating yoke embodying my invention.
Figure 2:
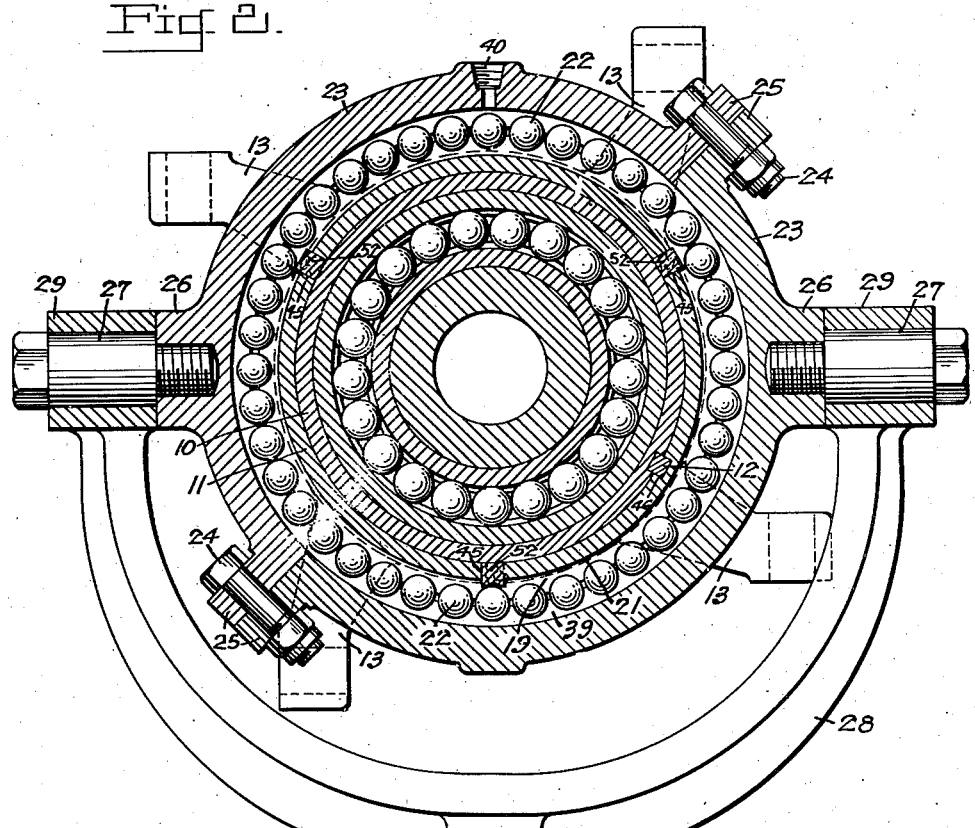
Fig. 2 is a cross section on the line 2—2 of Fig. 1.
Figure 4:
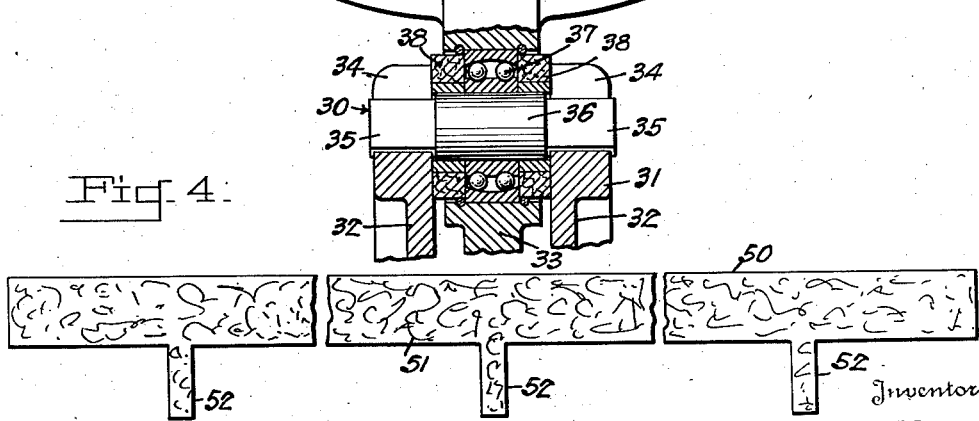
Fig. 4 is a plan of the wick device.

Referring to the drawings, there is illustrated a rotating hub 10 on which my throw-out sleeve 11 is mounted for longitudinal sliding movement, and in the instant case is part of a driving element of a clutch to which the sleeve is slidably keyed by a single key 12 engaged equally in opposed longitudinal key grooves on the hub and sleeve.

The sleeve has formed integrally thereon a plurality of thrust arms 13 having knuckles at their extremities from which in this device a special linkage is extended to a clutch apparatus not shown, although other arrangements and forms of thrust or other connections may be provided on the sleeve adapted to such other specific form of clutch as may be involved or required.

At its rear part the sleeve is thickened as at 15, and is formed with parallel circumscribing annular planiform flanges 16 forming therebetween a channel 17, having a flat bottom 18 as viewed in cross section, midway of which a groove or race 19 is formed having sloping sides 20 convergent inwardly at an angle of approximately twenty-five degrees to a diametrical plane. The race is formed with a flat bottom 21 spaced beyond a circle having its center adjacent the projected periphery of the sleeve over the groove and to which the faces 20 are tangent at radii of the circle intersecting the faces 20 a short distance below the top of the groove, which is at the bottom 18 of the channel 17. There is thus afforded a clearance between the bottom 21 and balls 22 set in the race and corresponding to the circle named.

A two-piece non-rotating annular collar 23 is engaged loosely in the channel 17, the duplicate parts of which are joined at a diametrical plane inclined at an angle of 45 degrees to the horizontal, by means of bolts 24 engaged through abutting lugs 25 on the ends of the segments of the collar. The assembled collar has formed thereon tapped and threaded radial external bosses 26 in which there are screwed stud pivot bolts 27 by which the collar is connected to a U-shaped spanner yoke or fork 28. The bolts are engaged revolubly in eyes 29 at the extremities of the arms of the yoke, and the latter clears the lugs 25. The yoke 28 is mounted pivotally at 30, as a lever of the first order, including a stationary support 31 including two arms 32 below the yoke and receiving therebetween a base shank 33 of the yoke. The upper ends of the arms 32 are formed with transverse alined guide slots 34 open on the upper ends of the arms, these slots having parallel sides, and receiving therein for vertical sliding movement rectangular trunnions 35 formed at the ends of a short, cylindrical shaft 36 fitted between the arms and engaged through the shank 33 in antifriction bearings 37 of conventional design, having dust-excluding felt washers 38 at each side.

The collar 23 is approximately square in cross section, and fits in the channel with a clearance at each side and at the bottom, next to the bottom 18 of the channel 17. It is formed with a ball race or groove 39 of the same form transversely as the race 19, and it fits upon the balls 22 in the same way. At least one port 40 is formed radially or otherwise through the collar opening through the central part of the race 39, to receive a conventional grease or oil injecting fitting not shown, there being several forms of such devices available.

The collar has formed in its front and rear sides concentric felt holding grooves 41, in which dust-excluding felts 42 are set, fitting against the inner faces of the flanges 16.

On the interior of the sleeve a flat bottomed channel 43 is formed, parallel to and close to the plane of the inner flange 16 of the sleeve and under the inner portion of the thickened part 15 of the sleeve. At intervals, short longitudinal and comparatively narrow rearward extensions 44 are formed (three being indicated). The rear ends of these extensions 44 underlie and intersect the extreme inner or bottom part of the race 19, so that respective ports 45 are formed. The channel 43 does not completely circumscribe the interior of the sleeve but is interrupted over a distance extending on each side of the key slot 46 forming channel ends 47 on each side of and stopping short of the key slot. The channel 43 is of substantial width (measured longitudinally of the sleeve), and is of uniform depth throughout its length and in its extensions.

The depth of the channel 43 measured from the inner face of the sleeve to the broad flat bottom, face 48 is more than the thickness of material between the bottom of the race and inner face of the sleeve, and a felt strip 50 is provided, cut to the same pattern as the form of the channel, including a broad body part 51, and short narrow arms 52 at one side spaced from the ends of the felt and from each other the same as the extensions 44 in relation to the channel 43.

The felt is also of a thickness slightly greater than the depth of the channel 43, and when laid therein snugly, the ends of the arms 52 extend across the race 19 partly in the path of the balls 22.

A grease or an oil of suitable viscosity may be supplied to the felt and bearings after assembly by coupling a grease gun or the like to the port 40, and operating the extruding means familiar in such devices, there being a number available which require no disclosure here.

In the operation of the device after impregnation of the felt with the lubricant its replenishment will be required at comparatively infrequent intervals.

In rotation of the sleeve with the driving member, the lubricant will be held in the channel 43 and it will infiltrate into the arms 52 where the balls 22, travelling successively across the same, will take up and transfer lubricant therefrom to the other balls and the races, as will be appreciated.

In reciprocation of the sleeve incident to clutching and declutching operations of the device, the felt will distribute lubricant along the hub 10, and so enable free movement of the sleeve.

While I have disclosed the invention in the best form known to me, it will be understood that this is exemplary and that changes of construction and proportion of parts, substitution of materials and equivalents mechanical or otherwise may be made thereon without departing from the spirit of the invention except as may be more specifically indicated in the appended claims.

As a means to limit movement of the collar 23, and sleeve 11 forwardly—which is the usual movement for causing engagement of the clutch—I have formed on the support 31 between its arms 32 a stop bar and boss 53 tapped and threaded on a diagonal axis to receive a stop bolt 54 in line with the shank 33, and engaging a corresponding boss 34 on the shank. A lock nut 55 secures the bolts in adjusted positions. This is useful in the clutch of my copending application but in other types or constructions of clutches may not be required, and may be omitted.

I claim:

1. A lubricated bearing comprising an inner sleeve, a longitudinally movable outer sleeve offset to form an annular channel between said inner and said outer sleeve and having an annular open channel formed circumferentially thereof and an inner raceway for ball bearings in the bottom of said channel, a sealed outer raceway disposed in said open channel, ball bearings disposed in said raceways, and a lubricating member disposed in said annular channel in engagement with said ball members and said inner sleeve.

2. A lubricated bearing as set forth in claim 1, wherein the sides of said outer raceway are sealed and apertures are provided in said raceway to lubricate it from the outer side thereof.

3. A lubricated bearing comprising a shaft, an inner sleeve supported on said shaft, a longitudinally movable outer sleeve telescopically disposed on said inner sleeve offset to form a closed inner channel with said inner sleeve and an open outer circumferential channel with apertures connecting said inner and outer channels, movable bearings disposed in said open channel, and a lubricating wick disposed in said inner channel for engaging said inner sleeve and said movable bearing.

4. A lubricated bearing as set forth in claim 3, wherein said inner channel has annular extensions with wicks disposed therein for connecting said open outer channel with said inner channel.

HARRY A. KNOX.